Figure 4:
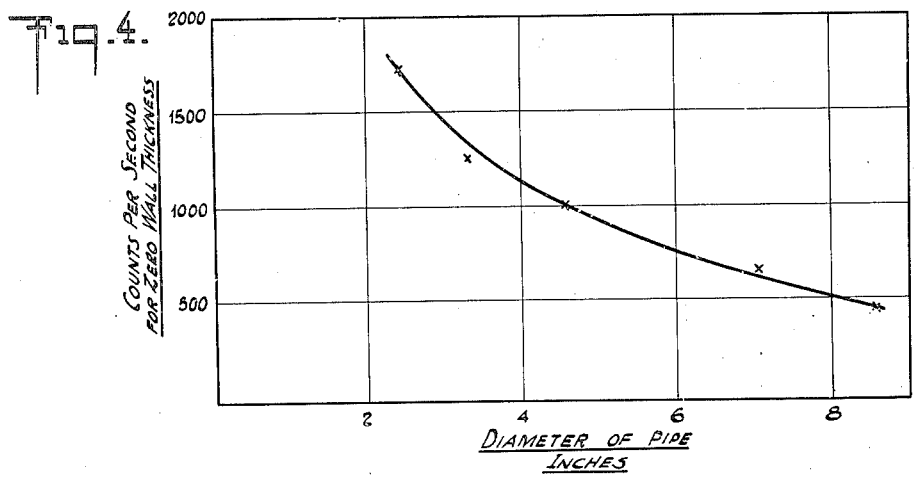

Nov. 1, 1949      A. WOLF      2,486,902
MEASUREMENT OF THICKNESS
Filed Jan. 8, 1946      3 Sheets-Sheet 1
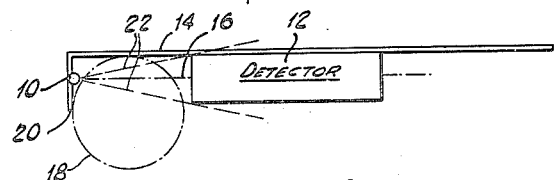
Fig.1a.
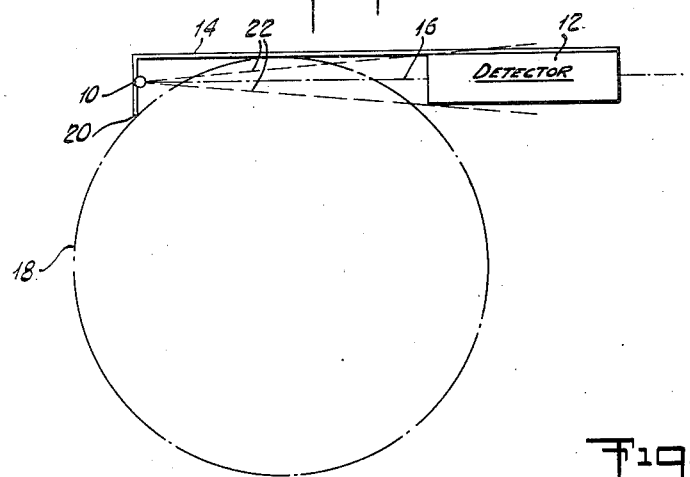
Fig.1b.
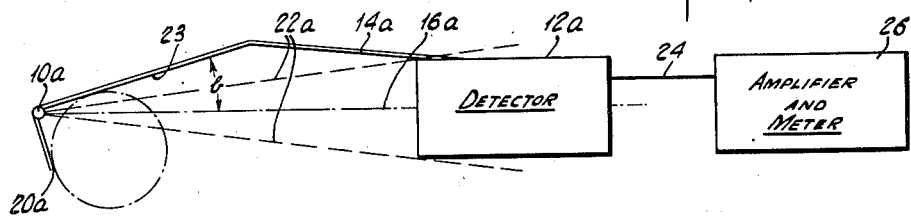
Fig.2a.
Fig.2b.
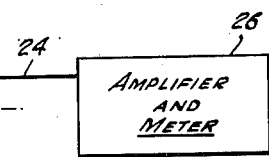
INVENTOR
ALEXANDER WOLF.
BY
ATTORNEY

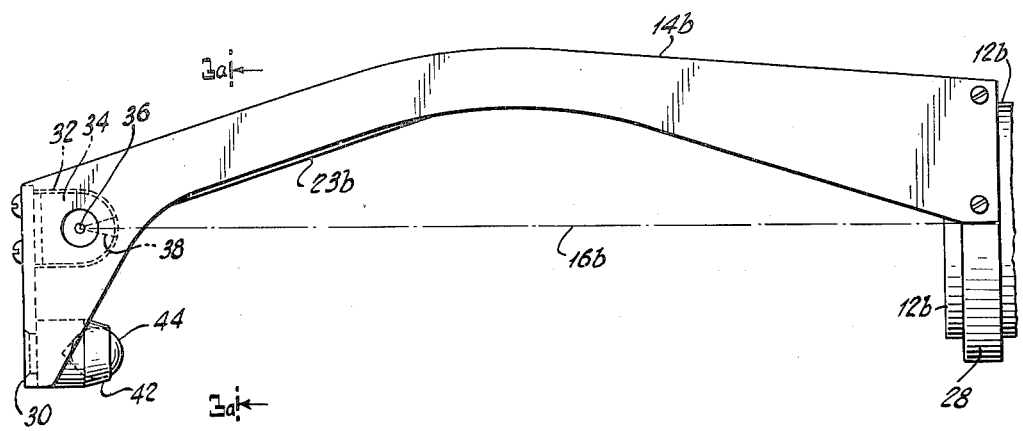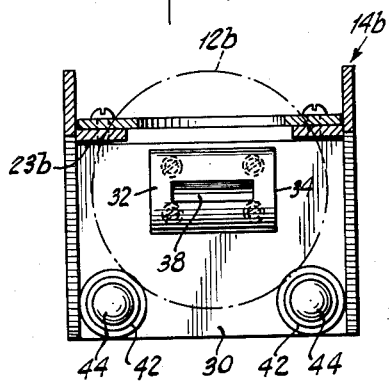

Patented Nov. 1, 1949

2,486,902

UNITED STATES PATENT OFFICE 2,486,902

MEASUREMENT OF THICKNESS

Alexander Wolf, Houston, Tex., assignor to The Texas Company, New York, N. Y., a corporation of Delaware Application January 8, 1946, Serial No. 639,760

8 Claims. (Cl. 250—83.6)

This invention relates to the measurement of thickness and more particularly to a device for measuring the thickness of the wall of a tubular object such as a pipe, a small vessel or the like. The principal object of the invention is the provision of a simple and rugged device containing no relatively movable or adjustable parts and of comparatively small dimensions so that it can be used in small spaces such as in the measuring of the thicknesses of tubes or pipes in a bank, as in a heat exchanger.

In the U. S. Letters Patent No. 2,349,429, granted May 23, 1944, to Gerhard Herzog and James H. Stein a method is disclosed for measuring the wall thickness of a curved object, which method has been termed the "tangential" method. In accordance with the disclosure in that patent a beam of penetrative radiation is directed to pass tangentially through the curved wall of the object to a radiation detector, the measurement of the detected intensity of radiation being an indication of the wall thickness. In the copending application of Gerhard Herzog, Serial No. 639,826, filed concurrently herewith a device embodying the general principles disclosed in the aforementioned patent is described, this device comprising essentially an elongated radiation detector, a radiation source disposed on the longitudinal axis of the detector and a frame for supporting the source and detector in adjustable relation, together with means comprising absorption blocks of different thicknesses for use in calibrating the instrument when the detector is set at predetermined distances from the source corresponding to the outside diameter of the tubular member to be measured.

The device of the present invention is an improvement over those described in the aforementioned patent and patent application.

In accordance with the present invention a source of penetrative radiation and a radiation detector are mounted axially and are separated by a fixed distance on a rigid non-adjustable frame or bracket. The frame is provided with a reference or contact plate in a plane inclined at an acute angle to the longitudinal axis of the detector, this plate extending substantially from the position of the source toward the detector. A second reference or contact member is provided at such a location that when a tube the wall thickness of which is to be measured is placed in the frame at right angles to the detector axis and against the reference plate and in contact with the second contact member, a beam of radiation from the source will pass tangentially through the tube wall to the detector. Due to the fact that the reference plate is inclined away from the line connecting the source and detector, accurate measurements can be made of tubes of various thicknesses of, say, two to eight inches in outside diameter. With this device no absorber or calibration blocks are needed and because of the geometry of the frame or bracket a substantially straight calibration curve can be obtained, while major variations of intensity with different tube diameters are eliminated, as will be described hereinafter. With this device maximum feasible intensity of the radiation beam can be employed for all pipe sizes, which, of course, insures an increase in accuracy for the larger tubes.

Figure 5:
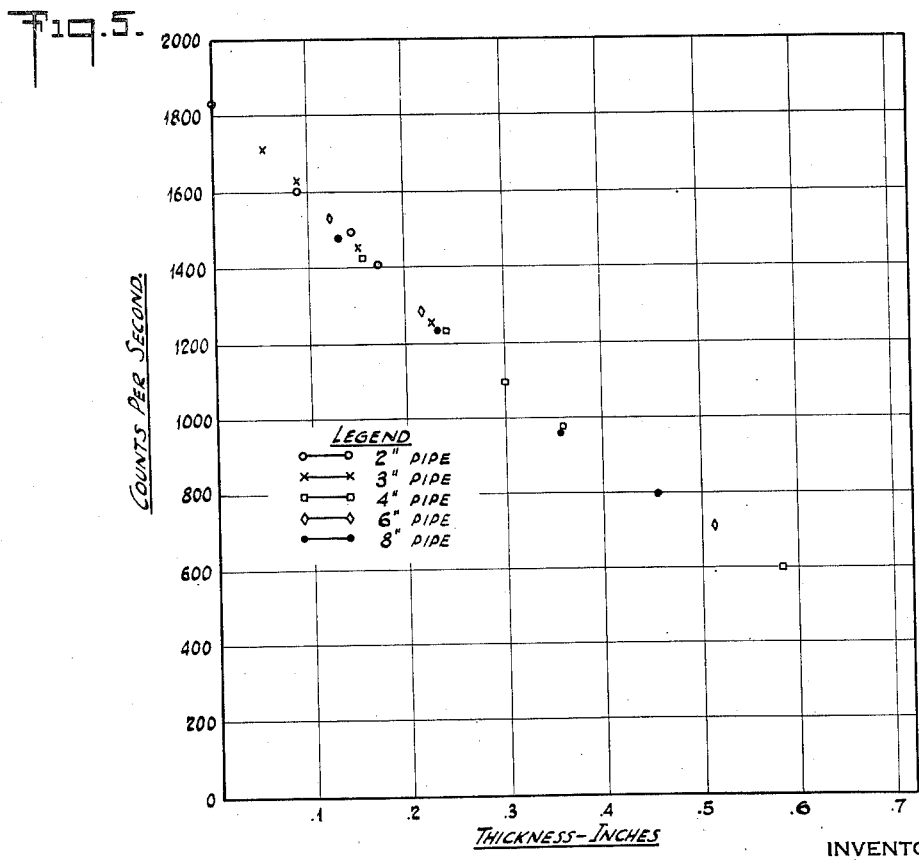

For a better understanding of the invention reference may be had to the accompanying drawings in which:

Figures 1a and 1b represent diagrammatically the arrangement in the aforementioned copending application of Gerhard Herzog, Figures 2a and 2b represent diagrammatically the position of the source and the detector in accordance with the present invention, Figure 3 is a side view of the essential parts of the device, Figure 3a is a cross section on the line 3a—3a of Figure 3 looking in the direction of the arrows, Figure 4 is a curve showing the variation of measured intensity with different pipe or tube diameters in the device of Figures 1a and 1b, and Figure 5 is a calibration curve.

Referring to the drawings the arrangement of the essential parts of the device disclosed in the aforementioned Herzog application is shown in Figures 1a and 1b, Figure 1a illustrating the instrument in position on a small pipe of, say, two inches outside diameter and Figure 1b the instrument in position on a larger pipe of, say, eight inches outside diameter. As shown in these figures the device comprises essentially a source of radiation 10, a radiation detector 12 such as a Geiger-Mueller counter and a straight bracket or frame 14 supporting the source on the longitudinal axis 16 of the detector, the bracket being adjustably secured to the detector so that the source and detector can be spaced to accommodate tubes or pipe of various diameters in the space between them. The device or "head" comprising the source 10, detector 12 and frame 14 is placed on a pipe 18 with the longitudinal axis of the device at right angles to the axis of the pipe in such a manner that the pipe 18 contacts the frame 14 and also another reference point 20 on a line more or less at right angles to the long portion of the frame 14. One or more absorption blocks, not shown, can be inserted in the space between the source 10 and the detector 12, the latter being set in a predetermined position on the frame 14, whereby a known amount of reduction of intensity in the gamma ray beam extending from the source to the detector will be obtained which can be used as a standard in calibrating the instrument.

It will be observed that as a result of separating the source 10 and detector 12 at various distances to accommodate pipes 18 of different diameters the total radiation impinging on the detector indicated by the angle between the dotted lines 22 drops rapidly as the pipe size increases. This is shown in Figure 4 in which the detector output is plotted against different spacings between the source and detector for different diameters of pipe, there having been, of course, no absorbing medium between the source and detector when the measurements were made. Consequently, if the source 10 is sufficiently large to enable a rapid measurement to be made on, say, an eight-inch pipe, then on a two-inch pipe the intensity at the detector is too high to be handled by the detector and its associated electronic circuits, not shown. Likewise, if the source 10 is small enough to be used on, say, a two-inch pipe then the intensity of radiation at the detector when the instrument is employed on a large pipe is too small for a rapid measurement with a high accuracy. Another consequence of this change in the spacing between the radiation source 10 and the detector 12 is a change in the angular width of the radiation beam 22, it being obvious from a study of Figures 1a and 1b that the beam is wider on the small pipe in Figure 1a than on the larger pipe of Figure 1b. It would be better to have this change in the opposite direction since large pipes are likely to vary more in thickness than small pipes.

In order to remedy the difficulties pointed out in the foregoing paragraph, and in accordance with the present invention, an arrangement as shown in Figures 2a and 2b is provided where, firstly, the distance between the radiation source 10a and the detector 12a is fixed, regardless of the size of the pipe, the wall thickness of which is to be measured, and secondly, the reference plane contacted by the outer surface of the pipe is inclined to the line connecting the source and the detector. Figure 2a shows the device as used with a small pipe 18a of say 2 inches outside diameter while Figure 2b shows the same device in use on a large pipe of, say, eight inches outside diameter. As shown in Figures 2a and 2b the radiation source 10a is supported by a frame or bracket 14a secured to the detector 12a and having the shape of an obtuse angle above the detector axis 16a. The bracket 14a includes a reference plane or contact plate 23 intersecting the axis 16a at or near the source 10a and extending generally toward the detector 12a at an acute angle b to the detector axis. The frame or bracket 14a also includes a contact point 20a on a line extending laterally from the reference plane 23 and passing through or near the source 10a. In the arrangement shown in Figures 1a and 1b and 2a and 2b the detector is, of course, connected by means of a suitable cable 24 to an instrument 26 including amplifying and other electronic circuits and a suitable meter for indicating the output of the detector. If desired, the housing of the detector 12a may include a preamplifier connected between the detector and the cable 24.

It will be seen that by means of the arrangement shown in Figures 2a and 2b the average linear width of the radiation beam 22a in the pipe 18a increases with the pipe size while at the same time the center of the beam indicated by the axis 16a is moved farther away from the outside of the pipe as the pipe size increases. With the arrangement shown in Figures 2a and 2b it is possible to eliminate all mechanical adjustments necessary between the source 10 and detector 12 of Figure 1a and at the same time to obtain a very satisfactory characteristic curve covering pipe sizes of various outside diameters having walls of from zero thickness up to the nominal thickness of a double extra heavy pipe.

In the copending application of Gerhard Herzog, A. H. Lord, Jr., L. M. Evans and R. B. Heath, Serial No. 574,870, filed January 27, 1945, electrical circuits are disclosed which can be used in connection with the amplification and the indication of the output of the detector 12a. When the circuits disclosed in that application are used in the instrument 26 as shown in Figure 2a of this application it is merely necessary to set the "Zero" adjustment so that the meter will read zero when there is no voltage on the detector or counter, and to set the "Sensitivity" adjustment so that the meter provides a full scale deflection when there is no pipe between the source 10a and the detector 12a.

A calibration of the present instrument showing the counting rate of a gamma ray detector as a function of the pipe thickness for pipes of various outside diameters is shown in Figure 5. It will be noted that the curves for the various pipe sizes are almost indistinguishable within the range of thicknesses employed. It will also be noted that the curve is quite steep. The curve of Figure 5 was obtained using a one-half mg. radium source and a gamma ray detector two inches in diameter. Similar results could, of course, be obtained with a detector of, say, one-inch diameter by employing a larger radium source and in some instances this would have the advantage that measurements could be made closer to pipe bends or couplings and in other restricted spaces.

In Figures 3 and 3a are shown two views of the essential parts of the "head" of the instrument shown diagrammatically in Figures 2a and 2b. The detector 12b has attached to its ends a frame or bracket 14b as by means of a band 28. The bracket 14b projects more or less longitudinally from the detector and may be arch-shaped over the detector axis 16b. As shown in Figure 3a the frame or bracket 14b is about the width of the detector 12b and has at its outer end a depending plate 30. Mounted on plate 30 is a holder 32 of brass or the like and containing a block 34 of gamma ray absorbing material such as lead. The holder 32 and block 34 are provided with a longitudinal opening in which the radiation source of 36 is disposed at right angles to the axis 16b. The block 34 is also provided with a cut-out portion or opening 38 forming a window through which gamma rays from the source 36 pass in a beam toward the detector 12b. The source 36 is so mounted that it is on the detector axis 16b, Attached to the underside of the outer portion of the frame 14b is a contact plate 23b forming a reference plane against which the outer surface of the tube to be measured is placed. This plate 23b or rather its plane passes through or near the source 36 and is inclined at an acute angle upwardly or away from the detector axis 16b. Mounted at the lower corner of the plate 30 are a pair of projecting contact members 42 the outer ends of these members preferably being provided with round surfaces 44 against which the pipe to be measured is also placed. It will be seen that due to the spacing of the contact surfaces 44 and the fact that these surfaces are in a plane intersecting the frame of the plate 23b near or at the source 36, the plane containing the contact surfaces 44 being parallel to the axis of the tube to be measured and at an angle of less than 180 degrees from the plane of the plate 23b, the tube to be measured can be placed in the frame with its outer surfaces against the two contact points 44 and against the contact plate 23b in such position that the gamma ray beam from the source 36 will pass tangentially through the wall of the tube toward the detector 12b as is shown in Figures 2a and 2b. Due to the inclination of the reference plane or contact plate 23b to the axis 16b, tubes of various diameters can be placed in the frame so that as tubes of increasing diameters are placed in the frame, the center of the beam will be located progressively farther from the outer surface of the tubes while at the same time the average linear width of the beam through the pipe also progressively increases. This is an advantage because as a rule larger tubes or pipe generally have thicker walls, or, in other words, the thickness of the wall of an eight inch "double extra heavy" pipe is greater than the thickness of a two-inch "double extra heavy" pipe.

It will be seen that with the elements of the device arranged geometrically as shown and described, a steep calibration curve results, no separate calibration blocks are needed and a rigid and simple construction can be used while due to the absence of larger variations of radiation intensity with tube diameters, the employment of maximum possible intensity for all tube sizes can be utilized, this insuring greater accuracy for larger tubes.

Obviously many modifications and variations of the invention, as hereinbefore set forth, may be made without departing from the spirit and scope thereof, but only such limitations should be imposed as are indicated in the appended claims.

I claim:

1. A device for measuring the thickness of tube walls comprising an elongated detector of gamma radiation, a frame attached to and extending longitudinally away from said detector, said frame containing a contact plate intersecting the axis of said detector and extending toward said detector while being inclined at an acute angle to said axis, a source of said gamma radiation disposed near said intersection of said plate and said axis, a contact member disposed on a line projecting laterally from said plate at said intersection, said contact plate and contact number defining an arcuate space for accommodating tubes of various diameters at right angles to said axis with the outer surface of a tube in contact with said plate and said member whereby a beam of radiation from the source is transmitted tangentially through the tube wall to the detector and the arrangement being such that as tubes of increasing diameters are placed in the frame the center of the beam will be located progressively farther from the outer surface of the tubes while at the same time the average linear width of the beam through the pipe increases, and means for indicating the intensity of said transmitted radiation.

2. A device for measuring the thickness of the wall of a tube comprising an elongated detector of gamma radiation, an arcuate frame attached to and extending longitudinally away from said detector, said frame containing a contact plate intersecting the axis of said detector and extending toward said detector while being inclined at an acute angle to said axis, a source of said gamma radiation disposed near said intersection of said plate and said axis, a contact member disposed on a line projecting substantially perpendicularly from said plate at said intersection, said contact plate and contact member defining an arcuate space for accommodating the tube to be measured at right angles to said axis with the outer surface of the tube in contact with said plate and said member whereby radiation from the source is transmitted tangentially through the tube wall to the detector, and means for indicating the intensity of said transmitted radiation.

3. A device for measuring the thickness of the wall of a tube comprising an elongated gamma ray detector, an arcuate frame attached to and extending longitudinally away from said detector, said frame containing a contact plate intersecting the axis of said detector and extending backwardly toward said detector while being inclined at an acute angle to said axis, a source of said gamma radiation disposed near said intersection of said plate and said axis, a contact member disposed on a line projecting substantially perpendicularly from said plate at said intersection, a pair of points on the outer end of said contact member, said points being in a line perpendicular to the plane containing the longitudinal axes of said detector and said frame and spaced equidistantly at opposite sides of said plane, said contact plate and contact points defining an arcuate space for accommodating the tube to be measured at right angles to said axis with the outer surface of the tube in contact with said plate and said member whereby radiation from the source is transmitted tangentially through the tube wall to the detector, and means for indicating the intensity of said transmitted radiation.

4. A device for measuring the thickness of the wall of a curved object such as a tube which comprises a source of penetrative radiation such as gamma rays, an elongated detector of said radiation, a frame for supporting said source in fixed separated relation to and on the longitudinal axis of said detector, said frame containing a reference plane intersecting said axis near said source and passing outwardly toward said detector at an acute angle to said axis, said frame also containing a contact member disposed on a line passing through said intersection and substantially perpendicular to said plane, the arrangement being such that said plane and said contact member form an arcuate space into which the object to be measured is placed at right angles to said axis and in contact with said contact member and also in tangential contact with said plane so that radiation from the source will pass tangentially to the detector through the wall of the object, and means for indicating the intensity of the radiation reaching the detector.

5. A device for measuring the thickness of the wall of a tube which comprises a source of gamma radiation, an elongated detector of said radiation, a frame attached to one end of said detector and extending substantially lengthwise away from said detector, said source being mounted on said frame in fixed spaced relation to and in alignment with the longitudinal axis of said detector, said frame having a fixed arm projecting laterally from said axis and said frame being arch-shaped between the source and the detector in the plane containing said axis and said arm and on the side of said axis opposite said arm, the arrangement being such that a tube the wall thickness of which is to be measured can be placed perpendicular to said frame and with a portion of the wall in contact with the arch-shaped portion of the frame and in contact with the outer end of said arm so that a beam of radiation from the source will pass tangentially through said wall portion to said detector and as tubes of increasing diameter are placed in the frame the center of the beam will be located progressively farther from the outer surface of the tubes while at the same time the average linear width of the beam through the pipe increases, and means for measuring the intensity of the radiation reaching the detector.

6. A device for measuring the thickness of the wall of a tubular object which comprises a source of gamma radiation, an elongated detector of said radiation, a frame attached to one end of said detector and extending substantially lengthwise away from said detector, said source being mounted on said frame in fixed space relation to and in alignment with the longitudinal axis of said detector, that portion of said frame extending between said detector and said source being arch-shaped so as to provide an arched space between the frame and said axis, an arm on said frame extending from said source at an acute angle to said axis, said frame adapted to be placed on and perpendicular to the object the wall thickness of which is to be measured, a portion of the wall of the object being accommodated in said arched space and in contact with the under surface of the arched portion of the frame and with the outer end of said arm so that radiation from the source will pass tangentially through said wall portion to said detector, and means for indicating the response of said detector.

7. A device for measuring the thickness of a tube wall comprising a source of gamma radiation, an elongated detector of said radiation, means for rigidly supporting said source at a fixed distance from and on the longitudinal axis of said detector so that said source and detector can be placed at opposite sides of the tube to be measured with said axis at right angles to the tube, said means comprising an elongated frame attached to the source and detector and having a portion between the source and detector arched away from said axis, a contact plate on the inner side of said arched portion and extending from a line near said source toward said detector at an acute angle to said axis, said plate being adapted to contact the outer surface of tubes of various diameters, means connected rigidly to said frame at a distance from said source and forming a second reference contact for said tubes, said plate and said second contact being positioned so that when they are in contact with a tube the radiation from the source will pass tangentially through the tube wall to the detector, and means for indicating the intensity of the radiation reaching the detector.

8. A device for measuring the thickness of a tube wall comprising a source of gamma radiation, an elongated detector of said radiation, means for rigidly supporting said source at a fixed distance from and on the longitudinal axis of said detector so that said source and detector can be placed at opposite sides of the tube to be measured with said axis at right angles to the tube, said means comprising an elongated frame attached to the source and detector and having a portion between the source and detector and arched away from said axis, a contact plate on the inner side of said arched portion and extending from a line near said source toward said detector at an acute angle to said axis, said plate being adapted to contact the outer surface of tubes of various diameters, means connected rigidly to said frame at a distance from said source and in a plane intersecting the plane of said plate near said source, said first plane being parallel to the axis of the tubes to be measured and making an angle less than 180 degrees with the plane of said plate, said last named means forming a second reference contact for said tubes, said plate and said second contact being positioned so that when they are in contact with a tube the radiation from the source will pass tangentially through the tube wall to the detector, and means for indicating the intensity of the radiation reaching the detector.

ALEXANDER WOLF.

REFERENCES CITED

The following references are of record in the file of this patent:

UNITED STATES PATENTS

| Number | Name | Date |
| --- | --- | --- |
| 2,349,429 | Herzog et al. | May 23, 1944 |
| 2,370,163 | Hare | Feb. 27, 1945 |